United States Patent
Shi et al.

(10) Patent No.: US 6,946,894 B2
(45) Date of Patent: Sep. 20, 2005

(54) CURRENT-MODE SYNAPSE MULTIPLIER CIRCUIT

(75) Inventors: Bingxue Shi, Beijing (CH); Lu Chen, Beijing (CH); Chun Lu, Beijing (CH)

(73) Assignee: Winbond Electronics Corporation, Hsinchu (TW)

( * ) Notice: Subject to any disclaimer, the term of this patent is extended or adjusted under 35 U.S.C. 154(b) by 41 days.

(21) Appl. No.: 10/459,529

(22) Filed: Jun. 12, 2003

(65) Prior Publication Data

US 2004/0251949 A1 Dec. 16, 2004

(51) Int. Cl.[7] ................................................. G06F 7/44
(52) U.S. Cl. ..................... 327/356; 327/357; 327/178
(58) Field of Search ............................... 327/108, 111, 327/112, 113, 114, 115, 116, 356, 357, 361, 178

(56) References Cited

U.S. PATENT DOCUMENTS

| | | | | |
|---|---|---|---|---|
| 5,343,555 A | * | 8/1994 | Yayla et al. | 706/35 |
| 5,420,806 A | * | 5/1995 | Shou et al. | 708/7 |
| 5,835,045 A | * | 11/1998 | Ogawa et al. | 341/155 |
| 5,929,672 A | * | 7/1999 | Mitani | 327/143 |
| 6,166,583 A | * | 12/2000 | Kochi et al. | 327/407 |
| 6,320,427 B1 | | 11/2001 | Shi et al. | 327/77 |

* cited by examiner

Primary Examiner—Timothy P. Callahan
Assistant Examiner—An T. Luu
(74) Attorney, Agent, or Firm—Finnegan, Henderson, Farabow, Garrett & Dunner, L.L.P.

(57) ABSTRACT

A current-mode synapse multiplier circuit multiplies each of a plurality of pulse signals with each of a corresponding plurality of weight signals. The synapse multiplier includes a plurality of first switches each coupled to a corresponding pulse signal and the corresponding weight signal. An integral circuit is coupled to the first switches to receive the weight signals that pass through the first switches and integrates the sum of the weight signals that pass through the first switches over a period of time. A voltage-to-current (V-I) converter is coupled to the integral circuit to convert the integral of the sum of the weight signals that pass through the first switches into a current signal, wherein the current signal represents the sum of the multiplication products of each pulse signal and the corresponding weight signal. An external reset signal is coupled to the synapse multiplier through a second switch to reset the synapse multiplier.

1 Claim, 4 Drawing Sheets

CURRENT-MODE SYNAPSE MULTIPLIER CIRCUIT

DESCRIPTION OF THE INVENTION

1. Field of the Invention

This invention relates to a synapse multiplier circuit and, more particularly, to a current-mode synapse multiplier circuit.

2. Background of the Invention

The application of an artificial neural network as a signal processing technique has been considered, and theories, modeling, and algorithms relating to such applications of neural networks continue to be developed. However, a limited availability of suitable integrated circuits has become a bottleneck for further development of artificial neural networks. In choosing a suitable circuit structure for implementing a neural network circuit, a digital circuit, an analog circuit, or a hybrid of both may be considered, depending on the requirements of precision, scale, speed, etc.

A digital circuit can be configured to have very high precision. Also, digital circuits experience fewer adverse effects and less serious problems caused by noise than analog circuits, therefore, signal transmission is easier for a digital circuit. However, because a digital circuit may take up a very large chip area, it may be more difficult to implement for a large-scale neural network. Moreover, since digital circuits generally work in a synchronous mode, i.e., they have to be synchronized to an external clock signal, their operation speed is greatly limited.

In contrast to a digital circuit, an analog circuit saves chip area and has a faster speed, but has a lower precision. Such lower precision may be less desirable for neural network applications.

An analog/digital (A/D) hybrid circuit, particularly, a pulse-based circuit, can provide advantages of both an analog circuit and a digital circuit. For example, a pulse-based circuit may exhibit desirable noise immunity and easier signal transmission of a digital circuit, while requiring smaller chip area and providing the faster operating speed of an analog circuit. Although a pulse-based circuit generates switching noise and increases circuit complexity, potential problems may be minimized or eliminated by adjusting the circuit configuration.

For a pulse-based circuit, there are several ways of modulating pulses. For example, pulse-width-modulation (PWM) has been considered suitable for implementation in VLSI technology. Implementations of PWM neural network circuits have been developed and include a synapse multiplier, a nonlinear neuron unit, and a PWM unit.

The synapse multiplier multiplies pulse signals that represent statuses of neuron units with corresponding analog weight signals. Depending on the type of the analog weight signals, there are two different types of synapse multipliers: a current-mode synapse multiplier and a voltage-mode synapse multiplier. The weight signals of a current-mode synapse multiplier are current signals, while the weight signals of a voltage-mode synapse multiplier are voltage signals. When a weight signal is a current signal, an example of the multiplication is to multiply the pulse width of a pulse signal with the current level of the weight signal.

A current mode synapse multiplier includes desirable features of smaller chip area and faster speed, operability with lower power supply voltages, and compatibility with digital CMOS integrated circuit technologies. Moreover, due to limitations of a relatively small power supply voltage for a neural network circuit, a voltage mode synapse multiplier generally has a narrow linear range when the pulse widths of the pulse signals are great. Compared to a voltage mode synapse multiplier, a current mode synapse multiplier has a much wider linear range.

SUMMARY OF THE INVENTION

In accordance with the present invention, there is provided a synapse multiplier circuit, connectable to a first power supply voltage, for multiplying a pulse signal with a weight signal. The synapse multiplier circuit includes a first switch coupled to receive the pulse signal and the weight signal, wherein the pulse signal has a first voltage level to turn off the first switch to block the weight signal and a second voltage level to turn on the first switch to pass the weight signal through the first switch; an integral circuit coupled to the first switch to receive the weight signal that passes through the first switch, wherein the integral circuit has an output that represents an integral of the weight signal that passes through the first switch over a period of time, and wherein the period of time corresponds to a pulse width of the pulse signal; a voltage-to-current (V-I) converter coupled to the integral circuit to convert the output of the integral circuit into an output current signal; and a second switch connectable to a second power supply voltage and a reset signal and coupled to the integral circuit for resetting the synapse multiplier circuit.

Also in accordance with the present invention, there is provided a synapse multiplier circuit for providing a sum of multiplication products of each of a plurality of pulse signals with a corresponding plurality of current weight signals. The synapse multiplier is connectable to receive a first power supply voltage, and includes a plurality of first switches each coupled to a corresponding one of the plurality of pulse signals and a corresponding one of the plurality of weight signals, each first switch being turned off when the corresponding pulse signal has a first voltage level and turned on to allow the corresponding weight signal to pass through when the corresponding pulse signal has a second voltage level; an integral circuit coupled to the plurality of first switches to integrate a sum of the weight signals that pass through the plurality of first switches over a period of time and to output a voltage signal representative of the integral of the sum over the period of time; a voltage-to-current (V-I) converter coupled to the integral circuit to convert the voltage signal output by the integral circuit into an output current signal; and a second switch connectable to receive a second power supply voltage and a reset signal and coupled to the integral circuit for resetting the synapse multiplier circuit, wherein the reset signal has a first voltage level to turn the second switch off when the synapse multiplier circuit is operating and a second voltage level to turn the second switch on to reset the synapse multiplier circuit.

Still in accordance with the present invention, there is provided a method of providing a sum of multiplication products of each of a plurality of pulse signals and a corresponding plurality of weight signals. The method includes providing a plurality of paths each controlled by a corresponding one of the plurality of pulse signals to allow the corresponding weight signal to pass through during a first period of time, wherein the corresponding pulse signal has a pulse width and the first period of time corresponds to the pulse width; integrating a sum of the plurality of weight signals that pass through the plurality of paths over a second period of time, wherein the second period of time is long enough to allow all of the plurality of pulse signals to pass; and converting an integral of the sum of the plurality of weight signals that pass through the plurality of paths over the second period of time into an output current signal, wherein the output current signal is representative of the sum of multiplication products of each pulse signal and the corresponding weight signal.

Further in accordance with the present invention, there is provided a neural network connectable to a first power supply voltage, including a pulse-width-modulation (PWM) circuit to convert at least one current signal into at least one pulse signal; a synapse multiplier circuit coupled to the PWM circuit to provide a sum of multiplication products of each of the at least one pulse signal with each of at least one weight signal; and a neuron unit coupled to the synapse multiplier circuit for converting the output current signal according to a nonlinear function. The synapse multiplier circuit includes at least one first switch coupled to a corresponding one of the at least one pulse signal and a corresponding one of the at least one weight signal, each first switch being turned off when the corresponding pulse signal has a first voltage level and turned on to allow the corresponding weight signal to pass through when the corresponding pulse signal has a second voltage level, an integral circuit coupled to the at least one first switch to integrate a sum of the at least one weight signal that passes through the at least one first switch over a period of time and to output a voltage signal representative of the integral of the sum over the period of time, a voltage-to-current (V-I) converter coupled to the integral circuit to convert the voltage signal output by the integral circuit into an output current signal, and a second switch connectable to receive a second power supply voltage and a reset signal and coupled to the integral circuit for resetting the synapse multiplier circuit.

Still further in accordance with the present invention, there is provided a neural network connectable to a first power supply voltage, including a plurality of pulse-width-modulation (PWM) circuits, each to convert at least one current signal into at least one pulse signal; a plurality of synapse multiplier circuits, each being coupled to one of the plurality of PWM circuits to provide a sum of multiplication products of each of the corresponding at least one pulse signal with each of at least one weight signal; and a plurality of neuron units, each coupled to one of the synapse multiplier circuits to convert the corresponding output current signal according to a nonlinear function. Each synapse multiplier circuit includes at least one first switch coupled to a corresponding one of the at least one pulse signal and a corresponding one of the at least one weight signal, each first switch being turned off when the corresponding pulse signal has a first voltage level and turned on to allow the corresponding weight signal to pass through when the corresponding pulse signal has a second voltage level, an integral circuit coupled to the at least one first switch to integrate a sum of the at least one weight signal that passes through the at least one first switch over a period of time and to output a voltage signal representative of the integral of the sum over the period of time, a voltage-to-current (V-I) converter coupled to the integral circuit to convert the voltage signal output by the integral circuit into an output current signal, and a second switch connectable to receive a second power supply voltage and a reset signal and coupled to the integral circuit for resetting the synapse multiplier circuit.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

In the drawings.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
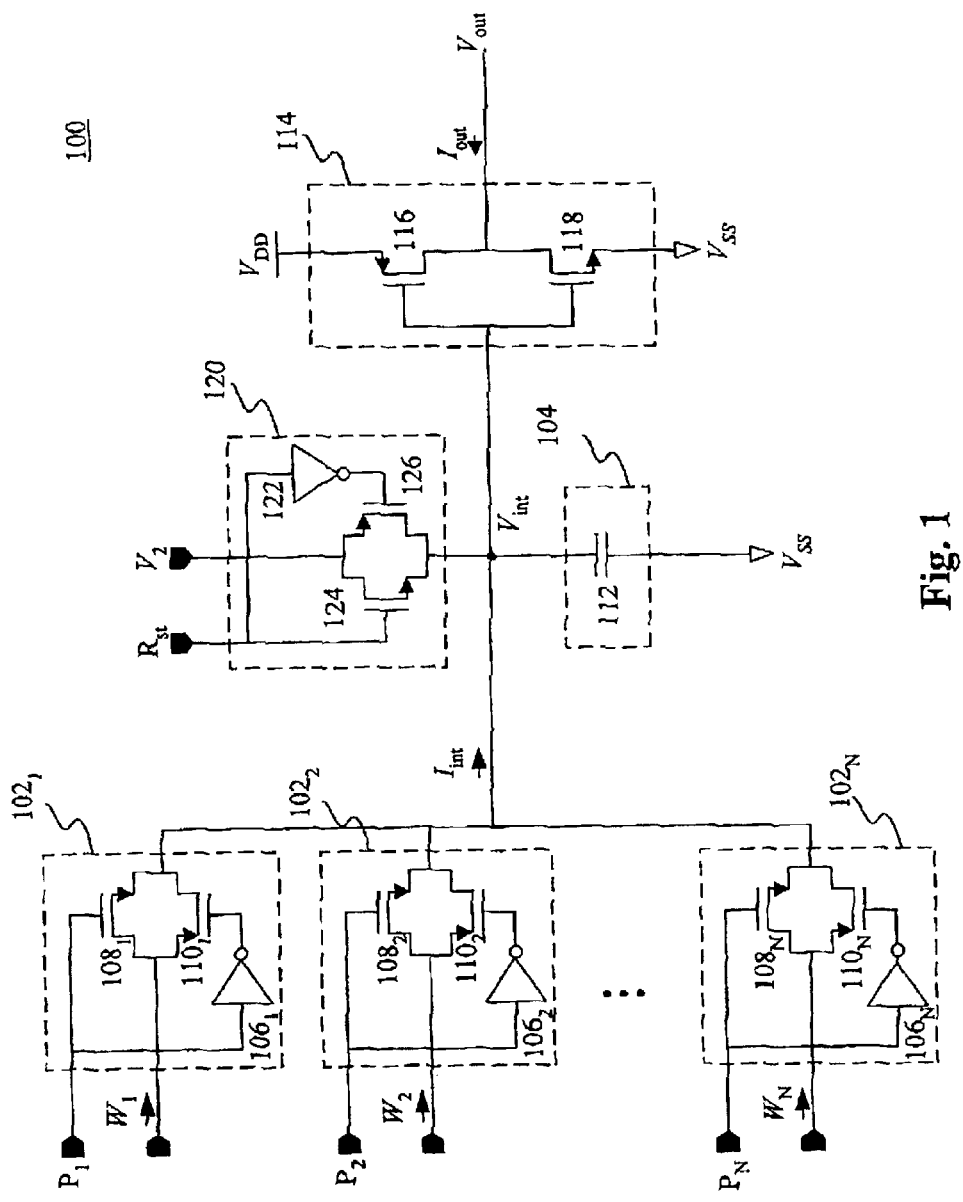
FIG. 1 shows a current-mode synapse multiplier circuit consistent with embodiments of the present invention.

An embodiment consistent with the present invention is shown in FIG. 1.

FIG. 1 shows a synapse multiplier circuit 100 suitable for use in a neural network. Synapse multiplier circuit 100 is connectable to a first power supply voltage $V_{DD}$ and a reference voltage or ground $V_{SS}$, for multiplying a plurality of pulse signals $P_1, P_2, \ldots, P_N$ with a plurality of weight signals $W_1, W_2, \ldots, W_N$, i.e., $P_1$ is multiplied by $W_1$, $P_2$ is multiplied by $W_2$, etc. In one aspect, weight signals $W_1, W_2, \ldots, W_N$ are current signals, and synapse multiplier 100 multiplies a pulse width $T_k$ of pulse signal $P_k$ with the current level of weight signal $W_k$ and outputs a signal $I_{out}$ that represents the sum of all the multiplication products of $P_k$ and $W_k$, wherein k=1,2, ..., N.

To facilitate description and without limitation, subscript letter k will be used hereinafter, wherein k can be any and every integer from 0 to N, if not otherwise specified.

Referring to FIG. 1, synapse multiplier 100 includes a plurality of switches $102_1, 102_2, \ldots, 102_N$ coupled to an integral circuit 104. Switch $102_k$ is coupled to receive pulse signal $P_k$ and weight signal $W_k$, and includes an inverter $106_k$, an NMOS transistor $108_k$, and a PMOS transistor $110_k$. Inverter $106_k$ includes an input terminal (not numbered) and an output terminal (not numbered). Each of NMOS transistor $108_k$ and PMOS transistor $110_k$ includes a gate (not numbered), a source (not numbered), and a drain (not numbered). The input terminal of inverter is coupled to receive pulse signal $P_k$. The output terminal of inverter $106_k$ is coupled to the gate of PMOS transistor $110_k$. The gate of NMOS transistor $108_k$ is coupled to receive pulse signal $P_k$. One of the source and drain of NMOS transistor $108_k$ is coupled to one of the source and drain of PMOS transistor $110_k$ and further coupled to receive weight signal $W_k$. The other of the source and drain of NMOS transistor $108_k$ is coupled to the other of the source and drain of PMOS transistor $110_k$ and further coupled to integral circuit 104.

When pulse signal $P_k$ has a high voltage level, transistors $108_k$ and $110_k$ are turned on. Therefore, switch $102_k$ is turned on and provides a path for weight signal $W_k$ to pass to integral circuit 104. When pulse signal $P_k$ has a low voltage level, transistors $108_k$ and $110_k$ are both turned off, and switch $102_k$ is turned off. Therefore, weight signal $W_k$ is isolated from integral circuit 104.

According to the circuit configuration of synapse multiplier 100 as shown in FIG. 1, when weight signals $W_1$, $W_2$, ..., $W_N$ are current signals, integral circuit 104 receives a current Iint that is the sum of weight signals $W_1$, $W_2$, ..., $W_N$ that pass through switches $102_1$, $102_2$, ..., $102_N$. The sum current Iint is then integrated over time by integral circuit 104. In one aspect, integral circuit 104 comprises a capacitor 112. As Iint charges capacitor 112, a voltage $V_{int}$ on capacitor 112, which is the output of integral circuit 104, reflects the integral of the sum current Iint over time.

A voltage-to-current (V-I) converter 114 is coupled to integral circuit 104 to convert $V_{int}$ into the current signal $I_{out}$. In one aspect, V-I converter 114 is a linear converter, i.e., $I_{out}$ has a linear relationship with $V_{int}$. Referring to FIG. 1, V-I converter 114 includes a PMOS transistor 116 and an NMOS transistor 118 forming a pair of CMOS transistors. Each of PMOS transistor 116 and NMOS transistor 118 includes a gate (not numbered), a source (not numbered), and a drain (not numbered). The gates of PMOS transistor 116 and NMOS transistor 118 are coupled together and further coupled to receive $V_{int}$. The source of PMOS transistor 116 is connectable to $V_{DD}$. The source of NMOS transistor 118 is connectable to $V_{SS}$. The drain of PMOS transistor 116 is coupled to the drain of NMOS transistor 118 for outputting $I_{out}$.

Synapse multiplier 100 is also connectable to an external reset signal $R_{st}$ through a switch 120. The reset signal $R_{st}$ has a first voltage level when synapse multiplier 100 is operating, and has a second voltage level to reset synapse multiplier 100 to an initial state. The initial state can be, for example, the output current signal $I_{out}$ of synapse multiplier 100 being zero. In one aspect, the first voltage level of $R_{st}$ is ground and the second voltage level of $R_{st}$ is $V_{DD}$.

Switch 120 includes an inverter 122, an NMOS transistor 124, and a PMOS transistor 126. Inverter 122 includes an input terminal (not numbered) and an output terminal (not numbered). Each of NMOS transistor 124 and PMOS transistor 126 includes a gate (not numbered), a source (not numbered), and a drain (not numbered). The input terminal of inverter 122 is connectable to receive $R_{st}$. The output terminal of inverter 122 is coupled to the gate of PMOS transistor 126. One of the source and drain of NMOS transistor 124 is coupled to one of the source and drain of PMOS transistor 126 and further coupled to integral circuit 104, i.e., capacitor 112. The other of the source and drain of NMOS transistor 124 is coupled to the other of the source and drain of PMOS transistor 126 and further connectable to a second power supply voltage $V_2$. In one aspect, the second power supply voltage $V_2$ is equal to one half the first power supply voltage $V_{DD}$.

To reset synapse multiplier 100, the reset signal $R_{st}$ is set to have a high voltage level, e.g., $V_{DD}$, to turn on transistors 124 and 126. Therefore, switch 120 is turned on to couple $V_2$ to capacitor 112, and capacitor 112 is discharged. As a result, $$V_{int} = V_2 = \frac{V_{DD}}{2}. \quad (1)$$

When the reset signal $R_{st}$ has a low voltage level, e.g., ground, switch 120 is turned off. The sum current $I_{int}$ starts to charge capacitor 112 and synapse multiplier 100 is operating.

If the voltage signal $V_{int}$ output by integral circuit 104 is within a certain range, i.e.

$$V_{out} - V_{TP} < V_{int} < V_{out} - V_{TN}, \quad (2)$$

wherein $V_{TN}$ and $V_{TP}$ are the threshold voltages of NMOS transistor 118 and PMOS transistor 116, respectively, and $V_{out}$ is the voltage output at the drains of PMOS transistor 116 and NMOS transistor 118, both PMOS transistor 116 and NMOS transistor 118 are operating in the saturation mode. When transistors 116 and 118 are operating in the saturation mode, the current signal $I_{out}$, expressed as the difference between the drain current $I_N$ of NMOS transistor 118 and the drain current $I_P$ of PMOS transistor 116, can be determined by equation (3):

$$I_{out} \equiv I_N - I_P = \frac{1}{2}\beta_N(V_{int} - V_{TN})^2 - \frac{1}{2}\beta_P(V_{int} - V_{TP} - V_{DD})^2, \quad (3)$$

wherein $\beta_N$ and $\beta_P$ are transconductance parameters of NMOS transistor 118 and PMOS transistor 116, respectively. When NMOS transistor 118 and PMOS transistor 116 are configured so that $\beta_N = \beta_P \equiv \beta$ and $V_{TN} = -V_{TP} \equiv V_T$, $$I_{out} = \beta(V_{DD} - 2V_T)(V_{int} - V_{DD}/2). \quad (4)$$

From equations (1) and (4), it is clear that when synapse multiplier 100 is reset by the reset signal $R_{st}$, the output current signal $I_{out}$ is equal to zero.

Assuming pulse signal $P_k$ starts with a low level voltage, changes to a high level voltage, and returns to the low level voltage, then the pulse width $T_k$ of pulse signal $P_k$ is the time difference between the two transitions, i.e., the duration of the high level voltage. Therefore, the period of time that weight signal $W_k$ is passed to integral circuit 104 corresponds to the pulse width $T_k$ of pulse signal $P_k$. Since $W_k$ is a current signal, the charge $Q_k$ thus accumulated in capacitor 104 due to weight signal $W_k$ is an integral of current weight signal $W_k$ over time $T_k$, as determined by equation (5):

$$Q_k = W_k T_k. \quad (5)$$

Similarly, the total charge Q accumulated in capacitor 104 due to all of weight signals $W_1$, $W_2$, ..., $W_N$ after all of pulse signals $P_1$, $P_2$, ..., $P_N$ have passed, is an integral of all of weight signals $W_1$, $W_2$, ..., $W_N$ that pass through switches $102_1$, $102_2$, ..., $102_N$ over a long period of time, and can be expressed by equation (6):

$$Q(t = \infty) = \sum_{k=1}^{N} W_k T_k. \quad (6)$$

wherein t is time and t=∞ is satisfied when all pulses $P_k$ have passed If at time 0, synapse multiplier 100 is reset, or, $$V_{int}(t=0) = \frac{V_{DD}}{2}, \quad (7)$$

then $$V_{int}(t=\infty) = \frac{V_{DD}}{2} + \frac{Q}{C} \quad (8)$$

$$= \frac{V_{DD}}{2} + \frac{1}{C}\sum_{k=1}^{N} W_k T_k,$$

wherein C is the capacitance of capacitor 112.

Applying equation (8) in equation (4) results in equation (9):

$$I_{out} = \frac{\beta}{C}(V_{DD} - 2V_T)\sum_{k=1}^{N} W_k T_k \quad (9)$$

$$\frac{\beta}{C}(V_{DD} - 2V_T)Q.$$

Therefore, the output current signal $I_{out}$ is linearly proportional to Q, and is also linearly proportional to the sum of all products of the pulse width $T_k$ of pulse signal $P_k$ and weight signal $W_k$. Particularly, when N=1, i.e., there is only one pulse signal $P_1$ and one weight signal $W_1$, the current signal $I_{out}$ is linearly proportional to the product of pulse $P_1$ and weight signal $W_1$.

Figure 2:
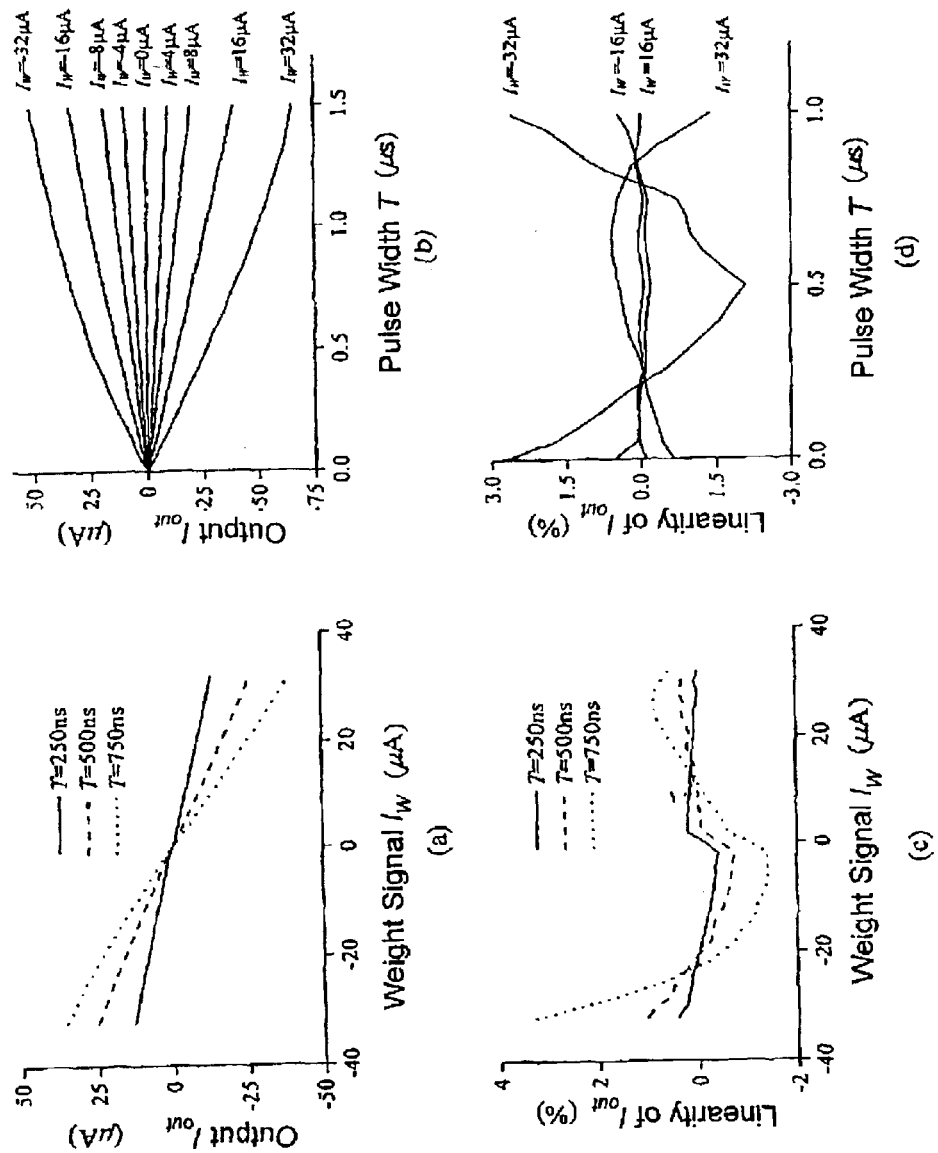
FIGS. 2a–2d graphically illustrate simulation results of the circuit of FIG. 1.

FIGS. 2a–2d are graphical illustrations of the results of simulating operations of synapse multiplier 100. Cadence's Spectre simulator is used to perform the simulations. The Spectre simulator is well-known to one skilled in the art and will not be described in detail. It is assumed that there is only one pair of only one pulse signal P and one weight current signal $I_W$. FIG. 2a illustrates the relationship between the output current $I_{out}$ and the weight current signal $I_W$. FIG. 2b illustrates the relationship between the output current $I_{out}$ and the pulse width T of pulse signal P for various values of weight current signal $I_W$. FIG. 2c shows the linearity of the output current $I_{out}$ of the curves shown in FIG. 2a versus the current level of weight current signal $I_W$. For a certain $I_W$, a linear-fit calculation is performed to find the best-fit line of the corresponding curve shown in FIG. 2a in the neighborhood of the certain $I_W$, and the linearity represents a standard deviation of the corresponding curve in the neighborhood from the best-fit line. Therefore, a smaller value of linearity indicates a smaller deviation from the best-fit line and, therefore, a better linearity. The linear-fit calculation is well-known to those skilled in the art and is not explained in further detail here. Similarly, FIG. 2d shows the linearity of the output current $I_{out}$ of the curves shown in FIG. 2b versus the pulse width T of pulse signal P for several values of weight current signal $I_W$. The model used for the transistors in synapse multiplier 100 is the Spectre model for 1.2 µm CMOS technologies, which is well-known to those skilled in the art.

Referring to FIG. 2a, the three lines show the relationship between the output current $I_{out}$ and weight current signal $I_W$ for three different pulse widths T of pulse signal P, respectively. The dotted line is for T=750 ns; the dashed line is for T=500 ns; and the solid line is for T=250 ns. Referring to FIG. 2b, a group of lines show the relationship between the output current $I_{out}$ and the pulse width T of pulse signal P for various values of weight current signal $I_W$ ranging from −32 µA to 32 µA. As shown in FIG. 2c, the linearity of the output current $I_{out}$ versus $I_W$ is mostly within 1%. As shown in FIG. 2d, the linearity of the output current $I_{out}$ versus the pulse width T of pulse signal P is within 3%. With the Spectre model used in the simulation, an approximation of the output current $I_{out}$ is obtained from the curves of FIG. 2a, as shown in equation (10):

$$I_{out}(\mu A) = -1.64 \times I_W(\mu A) \times T(\mu s). \quad (10)$$

Figure 3:
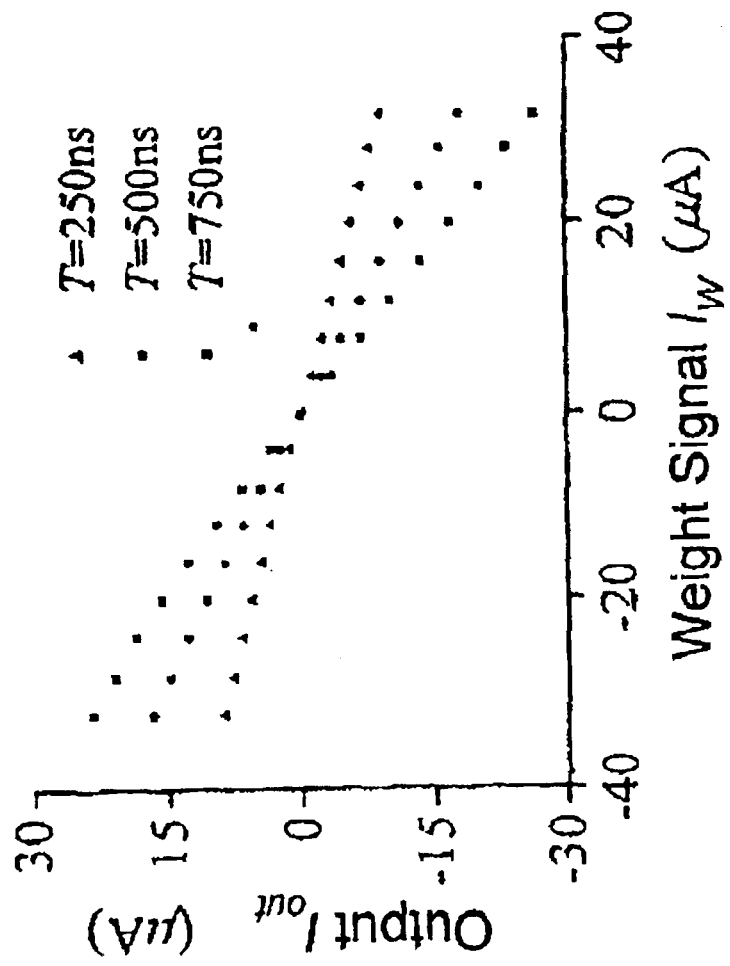
FIG. 3 graphically illustrates measurement results of the circuit of FIG. 1.

Synapse multiplier 100 was fabricated and operating characteristics were measured. During the measurement, the first power supply voltage $V_{DD}$ was 5V, $V_2$ was fixed at 2.5V, and the output current $I_{out}$ was obtained through measurement of the voltage drop across a 20-kOhm resistor as $I_{out}$ flowed through that resistor. FIG. 3 graphically illustrates three sets of the measurement results of the output current $I_{out}$, generated by the fabricated synapse multiplier 100, versus the weight current signal $I_W$ input to the fabricated synapse multiplier 100, corresponding to three different pulse widths T of pulse signal P of 250 ns, 500 ns, and 750 ns. FIG. 3 indicates a very good linearity of $I_{out}$ versus weight signal $I_W$.

It is to be understood that, although only the case when weight signal $W_k$ is a current signal has been described, weight signal $W_k$ can also be a voltage signal. When weight signals $W_k$ are voltage signals, synapse multiplier 100 may be implemented to obtain the sum of the multiplication products of the pulse width $T_k$ of pulse signal $P_k$ and the voltage level of $W_k$, and it would be necessary to modify integral circuit 104 and also include an adder circuit to sum up weight signals $W_1, W_2, \ldots, W_N$ that pass through switches $102_1, 102_2, \ldots, 102_N$. This also suggests an advantage of a current mode synapse multiplier as discussed above that, current signals $W_1, W_2, \ldots, W_N$ can be added together by merging those currents in a single conductor. In contrast, when $W_1, W_2, \ldots, W_N$ are voltage signals, an adder circuit is necessary to perform the addition function.

Figure 4:
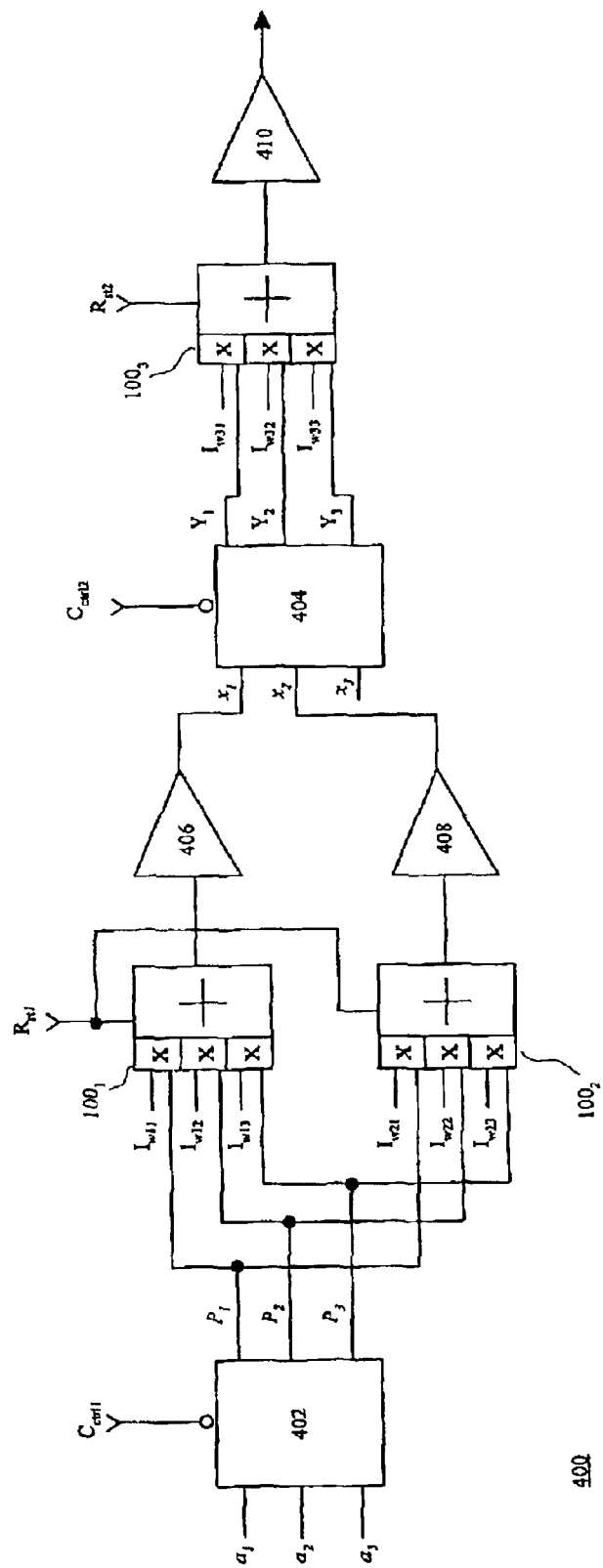
FIG. 4 shows a neural network circuit that includes a synapse multiplier consistent with the present invention.

FIG. 4 shows a neural network circuit 400 that includes synapse multiplier 100.

Referring to FIG. 4, neural network 400 includes three synapse multipliers 1001, 1002, and 1003, two pulse-width-modulation (PWM) circuits 402 and 404, and three nonlinear neuron units 406, 408, and 410.

PWM circuits 402 and 404 convert current signals into pulse signals. In particular, PWM circuit 402 converts current signals $a_1, a_2$, and $a_3$ into pulse signals $P_1, P_2$, and $P_3$, respectively. PWM circuit 404 converts current signals $x_1, x_2$, and $x_3$ into pulse signals $Y_1, Y_2$, and $Y_3$, respectively. PWM circuit 402 is coupled to an external control signal $C_{ctrl1}$, and PWM circuit 404 is coupled to an external control signal $C_{ctrl2}$. Control signals $C_{ctrl1}$ and $C_{ctrl2}$ switch on and off PWM circuits 402 and 404, respectively.

Synapse multiplier 1001 is coupled to PWM circuit 402 to receive pulse signals $P_1, P_2$, and $P_3$, multiply them with weight signals $I_{w11}, I_{w12}$, and $I_{w13}$, respectively, and output the sum of the three multiplication products. Synapse multiplier 1002 is also coupled to PWM circuit 402 to receive pulse signals $P_1, P_2$, and $P_3$, multiply them with weight signals $I_{w21}, I_{w22}$, and $I_{w23}$, respectively, and output the sum of the three multiplication products. Synapse multiplier 1003 is coupled to circuit 404 to receive pulse signals $Y_1, Y_2$, and $Y_3$, multiply them with weight signals $I_{w31}, I_{w32}$, and $I_{w33}$ respectively, and output the sum of the three multiplication products. An external control signal $R_{st1}$ is coupled to both synapse multipliers $100_1$ and $100_2$, and an external control signal $R_{st2}$ is coupled to synapse multiplier $100_3$. Control signals $R_{st1}$ and $R_{st2}$ switch on and off the three synapse multipliers.

Each of nonlinear neuron units 406, 408, and 410 has an input terminal coupled to the output of its corresponding synapse multiplier, and an output terminal. The output of neuron unit 406 is coupled to PWM circuit 404 as input signal $x_1$. The output of neuron unit 408 is coupled to PWM circuit 404 as input signal $x_2$. The output of neuron unit 410 is the output of neural network circuit 400. Each of nonlinear neuron units 406, 408, and 410 converts the output of the corresponding synapse multiplier according to a nonlinear function, for example, a sigmoid function.

It will now be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A neural network connectable to a first power supply voltage, comprising:

a plurality of pulse-width-modulation (PWM) circuits, each to convert at least one current signal into at least one pulse signal;

a plurality of synapse multiplier circuits, each being coupled to one of the plurality of PWM circuits to provide a sum of multiplication products of each of the at least one pulse signal with each of at least one weight signal, each synapse multiplier circuit including at least one first switch coupled to a corresponding one of the at least one pulse signal and a corresponding one of the at least one weight signal, each first switch being turned off when the corresponding pulse signal has a first voltage level and turned on to allow the corresponding weight signal to pass through when the corresponding pulse signal has a second voltage level, an integral circuit coupled to the at least one first switch to integrate a sum of the at least one weight signal that passes through the at least one first switch over a period of time and to output a voltage signal representative of the integral of the sum over the period of time, a voltage-to-current (V-I) converter coupled to the integral circuit to convert the voltage signal output by the integral circuit into an output current signal, and a second switch connectable to receive a second power supply voltage and a reset signal and coupled to the integral circuit for resetting the synapse multiplier circuit; and a plurality of neuron units, each coupled to one of the synapse multiplier circuits to convert the corresponding output current signal according to a nonlinear function.

* * * * *